United States Patent
Larsson et al.

(10) Patent No.: US 7,535,819 B1
(45) Date of Patent: May 19, 2009

(54) MULTIBAND OFDM SYSTEM WITH MAPPING

(75) Inventors: Torbjorn Larsson, San Diego, CA (US); Nishant Kumar, San Diego, CA (US)

(73) Assignees: Staccato Communications, Inc., San Diego, CA (US); Samsung Electronics Co., Ltd., Kyungki-Do (KR)

( * ) Notice: Subject to any disclaimer, the term of this patent is extended or adjusted under 35 U.S.C. 154(b) by 865 days.

(21) Appl. No.: 10/948,615

(22) Filed: Sep. 22, 2004

Related U.S. Application Data

(60) Provisional application No. 60/506,547, filed on Sep. 26, 2003, provisional application No. 60/508,670, filed on Oct. 2, 2003, provisional application No. 60/511,959, filed on Oct. 16, 2003, provisional application No. 60/519,000, filed on Nov. 10, 2003, provisional application No. 60/523,868, filed on Nov. 19, 2003.

(51) Int. Cl.
*H04J 11/00* (2006.01)

(52) U.S. Cl. .................................................. 370/208

(58) Field of Classification Search .............. None
See application file for complete search history.

(56) References Cited

U.S. PATENT DOCUMENTS

| | | | |
|---|---|---|---|
| 6,622,281 B1 | 9/2003 | Yun et al. | |
| 6,798,826 B1 | 9/2004 | Shiu et al. | |
| 6,925,128 B2 * | 8/2005 | Corral | 375/260 |
| 7,277,498 B2 * | 10/2007 | Hanaoka et al. | 375/316 |
| 7,289,494 B2 * | 10/2007 | Lakkis | 370/366 |
| 7,313,190 B2 * | 12/2007 | Balakrishnan et al. | 375/260 |
| 7,362,817 B2 * | 4/2008 | Ojard | 375/285 |
| 2002/0089923 A1 * | 7/2002 | Yoshida et al. | 370/208 |
| 2003/0073464 A1 * | 4/2003 | Giannakis et al. | 455/562 |
| 2004/0001429 A1 * | 1/2004 | Ma et al. | 370/210 |
| 2004/0032354 A1 * | 2/2004 | Knobel et al. | 341/133 |
| 2004/0062193 A1 * | 4/2004 | Ma et al. | 370/208 |
| 2004/0190640 A1 | 9/2004 | Dubuc et al. | |

(Continued)

FOREIGN PATENT DOCUMENTS

KR 2003/0062273 7/2003

(Continued)

OTHER PUBLICATIONS

IEEE P802.15, TI Physical Layer Proposal for IEEE 802.15 Task Group 3a, May 2003.

(Continued)

*Primary Examiner*—Anh-Vu Ly
(74) *Attorney, Agent, or Firm*—Van Pelt, Yi & James LLP

(57) ABSTRACT

A method of improving frequency diversity of a signal that includes a plurality of orthogonal frequency division multiplexing (OFDM) symbols comprises receiving an input data sequence, mapping the input data sequence to a transmission data sequence, wherein the mapping includes performing a mapping operation and generating an OFDM symbol using the transmission data sequence. An orthogonal frequency division multiplexing (OFDM) transmitter comprises an interface configured to receive an input data sequence, and a processor configured to perform a mapping operation, to map the input data sequence to a transmission data sequence wherein the mapping includes performing the mapping operation, and to generate an OFDM symbol using the transmission data sequence.

22 Claims, 10 Drawing Sheets

U.S. PATENT DOCUMENTS

2005/0018750 A1 * 1/2005 Foerster et al. .............. 375/130
2005/0047444 A1 * 3/2005 Park et al. ................... 370/480

FOREIGN PATENT DOCUMENTS

WO     WO 02/062002     8/2002

OTHER PUBLICATIONS

IEEE 802.15-03/267r2, Multi-band OFDM Physical Layer Proposal, Jul. 2003.

IEEE, Multi-band OFDM Physical Layer Proposal for IEEE 802.15 Task Group 3a, Apr. 2005.

* cited by examiner

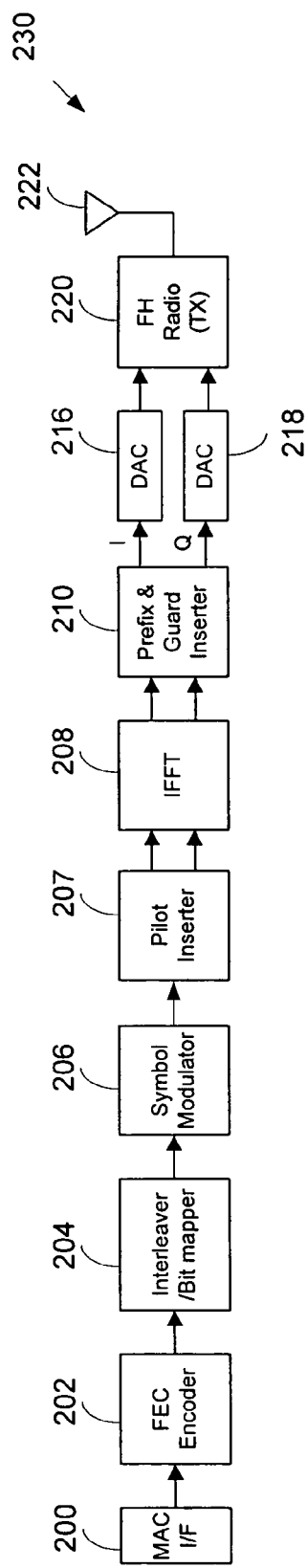
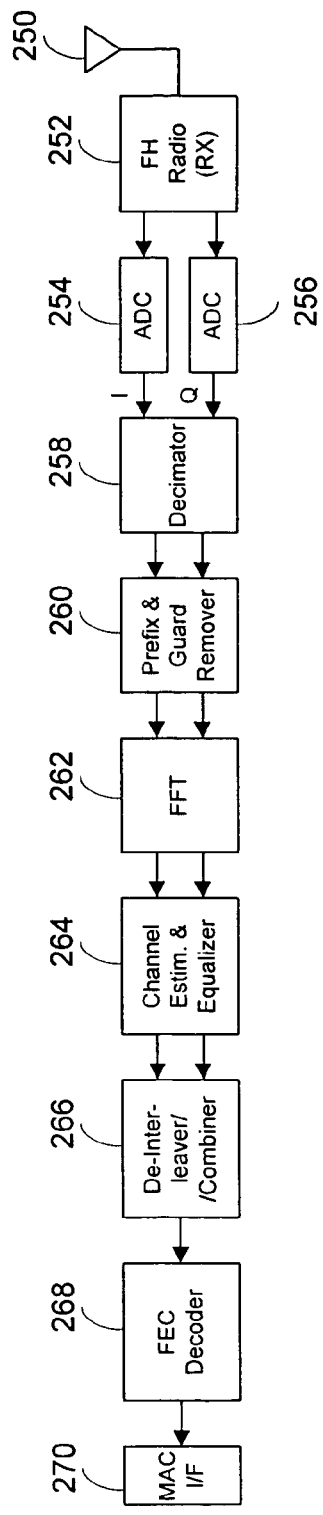
FIG. 2A
FIG. 2B

Hop bands

| f1 | f2 | f3 | f1 | f2 | f3 | f1 | f2 | f3 | f1 | f2 | f3 |
|---|---|---|---|---|---|---|---|---|---|---|---|
| $b_0$ | $b_{597}$ | $b_{567}$ | $b_{537}$ | $b_1$ | $b_{598}$ | $b_{568}$ | $b_{538}$ | $b_2$ | $b_{599}$ | $b_{569}$ | $b_{539}$ |
| $b_{30}$ | $b_0$ | $b_{597}$ | . | $b_{31}$ | $b_1$ | $b_{598}$ | . | $b_{32}$ | $b_2$ | $b_{599}$ | . |
| . | . | $b_0$ | . | . | . | $b_1$ | . | . | . | $b_2$ | . |
| $b_3$ | . | . | $b_0$ | $b_4$ | . | . | $b_1$ | $b_5$ | . | . | $b_2$ |
| . | $b_3$ | . | . | . | $b_4$ | . | . | . | $b_5$ | . | . |
| . | . | $b_3$ | . | . | . | $b_4$ | . | . | . | $b_5$ | . |
| $b_6$ | . | . | $b_3$ | $b_7$ | . | . | $b_4$ | $b_8$ | . | . | $b_5$ |
| . | $b_6$ | . | . | . | $b_7$ | . | . | . | $b_8$ | . | . |
| . | . | $b_6$ | . | . | . | $b_7$ | . | . | . | $b_8$ | . |
| $b_9$ | . | . | $b_6$ | $b_{10}$ | . | . | $b_7$ | $b_{11}$ | . | . | $b_8$ |
| . | $b_9$ | . | . | . | $b_{10}$ | . | . | . | $b_{11}$ | . | . |
| . | . | $b_9$ | . | . | . | $b_{10}$ | . | . | . | $b_{11}$ | . |
| $b_{12}$ | . | . | $b_9$ | $b_{13}$ | . | . | $b_{10}$ | $b_{14}$ | . | . | $b_{11}$ |
| . | $b_{12}$ | . | . | . | $b_{13}$ | . | . | . | $b_{14}$ | . | . |
| . | . | $b_{12}$ | . | . | . | $b_{13}$ | . | . | . | $b_{14}$ | . |
| . | . | . | $b_{12}$ | . | . | . | $b_{13}$ | . | . | . | $b_{14}$ |
| $b_{51}$ | . | . | . | $b_{52}$ | . | . | . | $b_{53}$ | . | . | . |
| . | $b_{51}$ | . | . | . | $b_{52}$ | . | . | . | $b_{53}$ | . | . |
| . | . | $b_{51}$ | . | . | . | $b_{52}$ | . | . | . | $b_{53}$ | . |
| $b_{54}$ | . | . | $b_{51}$ | $b_{55}$ | . | . | $b_{52}$ | $b_{56}$ | . | . | $b_{53}$ |
| . | $b_{54}$ | . | . | . | $b_{55}$ | . | . | . | $b_{56}$ | . | . |
| . | . | $b_{54}$ | . | . | . | $b_{55}$ | . | . | . | $b_{56}$ | . |
| $b_{57}$ | . | . | $b_{54}$ | $b_{58}$ | . | . | $b_{55}$ | $b_{59}$ | . | . | $b_{56}$ |
| . | . | . | . | . | . | . | . | . | . | . | . |
| $b_{567}$ | $b_{537}$ | . | . | $b_{568}$ | $b_{538}$ | . | . | $b_{569}$ | $b_{539}$ | . | . |
| $b_{597}$ | $b_{567}$ | $b_{537}$ | $b_{507}$ | $b_{598}$ | $b_{568}$ | $b_{538}$ | $b_{508}$ | $b_{599}$ | $b_{569}$ | $b_{539}$ | $b_{509}$ |

600  602  604  606

← subcarriers →

FIG. 6

Hop bands

| f1 | f2 | f3 | f1 | f2 | f3 | f1 | f2 | f3 | f1 | f2 | f3 |
|---|---|---|---|---|---|---|---|---|---|---|---|
| $b_0$ | $b_{567}$ | $b_{597}$ | $b_{30}$ | $b_1$ | $b_{568}$ | $b_{598}$ | $b_{31}$ | $b_2$ | $b_{569}$ | $b_{599}$ | $b_{32}$ |
| . | $b_{537}$ | $b_{567}$ | $b_{60}$ | . | $b_{538}$ | $b_{568}$ | $b_{61}$ | . | $b_{539}$ | $b_{569}$ | $b_{62}$ |
| . | . | . | . | . | . | . | . | . | . | . | . |
| $b_3$ | $b_{564}$ | . | $b_{33}$ | $b_4$ | $b_{565}$ | . | $b_{34}$ | $b_5$ | $b_{566}$ | . | $b_{35}$ |
| . | . | $b_{564}$ | . | . | . | $b_{565}$ | . | . | . | $b_{566}$ | . |
| . | . | . | . | . | . | . | . | . | . | . | . |
| $b_6$ | $b_{561}$ | . | $b_{36}$ | $b_7$ | $b_{562}$ | . | $b_{37}$ | $b_8$ | $b_{563}$ | . | $b_{38}$ |
| . | . | $b_{561}$ | . | . | . | $b_{562}$ | . | . | . | $b_{563}$ | . |
| . | . | . | . | . | . | . | . | . | . | . | . |
| $b_9$ | $b_{558}$ | . | $b_{39}$ | $b_{10}$ | $b_{559}$ | . | $b_{40}$ | $b_{11}$ | $b_{560}$ | . | $b_{41}$ |
| . | . | $b_{558}$ | . | . | . | $b_{559}$ | . | . | . | $b_{560}$ | . |
| . | . | . | . | . | . | . | . | . | . | . | . |
| $b_{12}$ | $b_{555}$ | . | $b_{42}$ | $b_{13}$ | $b_{556}$ | . | $b_{43}$ | $b_{14}$ | $b_{557}$ | . | $b_{44}$ |
| . | . | $b_{555}$ | . | . | . | $b_{556}$ | . | . | . | $b_{557}$ | . |
| . | . | . | . | . | . | . | . | . | . | . | . |
| . | . | . | . | . | . | . | . | . | . | . | . |
| . | . | . | . | . | . | . | . | . | . | . | . |
| $b_{594}$ | $b_{570}$ | . | $b_{27}$ | $b_{595}$ | $b_{571}$ | . | $b_{28}$ | $b_{596}$ | $b_{572}$ | . | $b_{29}$ |
| . | . | $b_{570}$ | . | . | . | $b_{571}$ | . | . | . | $b_{572}$ | . |
| $b_{567}$ | $b_0$ | . | $b_{597}$ | $b_{568}$ | $b_1$ | . | $b_{598}$ | $b_{569}$ | $b_2$ | . | $b_{599}$ |
| $b_{597}$ | $b_{597}$ | $b_0$ | $b_0$ | $b_{598}$ | $b_{598}$ | $b_1$ | $b_1$ | $b_{599}$ | $b_{599}$ | $b_2$ | $b_2$ |

↑ subcarriers ↓

MULTIBAND OFDM SYSTEM WITH MAPPING

CROSS REFERENCE TO RELATED APPLICATIONS

This application claims priority to U.S. Provisional Patent Application No. 60/506,547 entitled MULTIBAND OFDM SYSTEM filed Sep. 26, 2003 which is incorporated herein by reference for all purposes; and U.S. Provisional Patent Application No. 60/508,670 entitled MULTIBAND OFDM SYSTEM WITH BLOCK CODE SPREADING filed Oct. 2, 2003 which is incorporated herein by reference for all purposes, and U.S. Provisional Patent Application No. 60/511,959 entitled MULTIBAND OFDM SYSTEM filed Oct. 16, 2003 which is incorporated herein by reference for all purposes; and U.S. Provisional Patent Application No. 60/519,000 entitled MULTIBAND OFDM SYSTEM filed Nov. 10, 2003 which is incorporated herein by reference for all purposes; and U.S. Provisional Patent Application No. 60/523,868 entitled MULTIBAND OFDM SYSTEM WITH BIT ORDER REVERSAL filed Nov. 19, 2003 which is incorporated herein by reference for all purposes.

FIELD OF THE INVENTION

The present invention relates generally to communication systems. More specifically, an orthogonal frequency division multiplexing (OFDM) system and method are disclosed.

BACKGROUND OF THE INVENTION

Multiband orthogonal frequency division multiplexing (MB-OFDM) is a modulation technique used in some wireless communication systems such as ultra-wideband (UWB). The MB-OFDM modulation technique combines OFDM modulation with frequency hopping. It is a modulation technique suitable for devices designed to comply with Federal Communications Commission (FCC) regulations relating to UWB devices. According to the current regulations, UWB devices are allowed to operate in the frequency band between 3.1 to 10.6 GHz, provided that the bandwidth occupied by a UWB device is at least 500 MHz and the radiated power, when measured over a bandwidth of 1 MHz, is less than −41.3 dBm anywhere within the signal band.

In some MB-OFDM systems, encoded bits are transmitted as OFDM symbols that each includes Quadrature Phase Shift Keying (QPSK) modulated sub-carriers (also referred to as tones) and pilot tones. Typically, an OFDM symbol includes a set of sub-carriers provided via a local oscillator (LO). In some embodiments, after the OFDM symbol is transmitted, the LO switches its frequency setting and a different set of sub-carriers are provided for the next symbol. The resulting waveform is a frequency hopping waveform in which each OFDM symbol corresponds to a hop in the transmit frequency band. In some embodiments, the LO remains at the same frequency setting throughout the transmission.

FIG. 1 is a diagram illustrating a frequency hopping pattern according to some MB-OFDM system embodiments. In this example, each rectangle represents an OFDM symbol carrying 200 bits. Three hop bands f1, f2 and f3 are used to facilitate frequency hopping between symbols. Symbols 100, 102 and 104 are each modulated using a different set of sub-carriers associated with frequency bands f1, f2 and f3, respectively. The pattern is then repeated for the next three symbols, 106, 108 and 110 and so on. In this example, the OFDM symbol rate is 3.2 Mbps, giving an over-the-air bit rate of 200*3.2=640 Mbps.

Although frequency hopping is useful for reducing interference among adjacent UWB devices, several issues remain. When data is transmitted at a rate lower than the maximum rate supported by the system, data bits are commonly duplicated and then modulated for transmission. The same data bit may be modulated multiple times on to the same sub-carrier frequency, causing the duplicated symbols to be subject to the same multipath and fading conditions and resulting in reduced frequency diversity. Furthermore, adjacent data bits are sometimes encoded using sub-carriers that are the same or close in frequency, also resulting in reduced frequency diversity. It would be desirable if the data bits could be encoded such that frequency diversity of the same data bits as well as adjacent data bits could be improved. It would also be desirable if the encoding scheme could be implemented without adding significant additional cost and complexity to the existing transmitter and receiver designs.

BRIEF DESCRIPTION OF THE DRAWINGS

Various embodiments of the invention are disclosed in the following detailed description and the accompanying drawings.

FIG. 2A is a block diagram illustrating a UWB transmitter embodiment.

FIG. 2B is a block diagram illustrating a UWB receiver embodiment.

FIG. 6 is a diagram illustrating another transmission data pattern according to some embodiments.

FIG. 7 is a diagram illustrating another transmission data pattern according to some embodiments.

DETAILED DESCRIPTION

Figure 1:
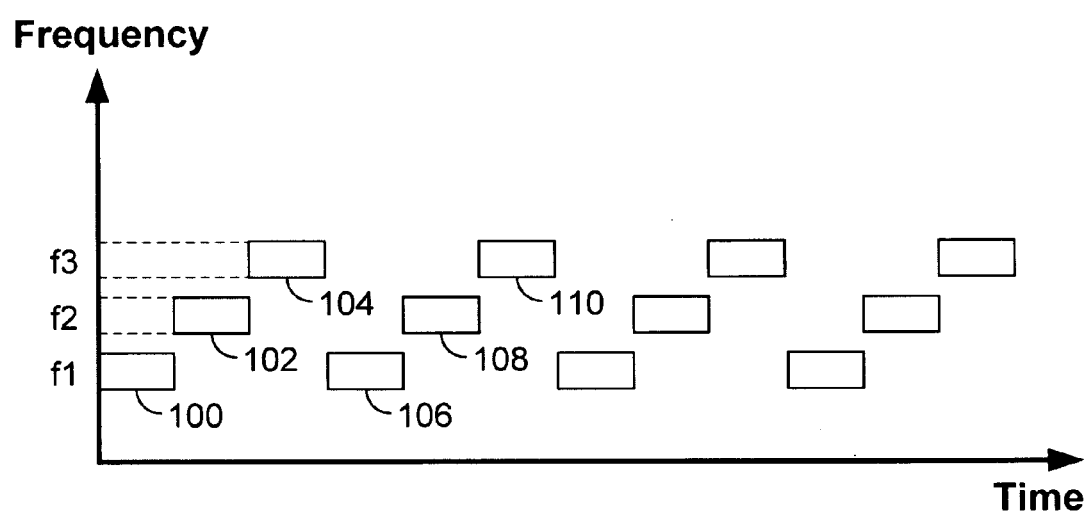
FIG. 1 is a diagram illustrating a frequency hopping pattern according to some MB-OFDM system embodiments.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and a system are disclosed for improving frequency diversity of a signal that includes a plurality of orthogonal frequency division multiplexing (OFDM) symbols. An input data sequence is mapped to a transmission data sequence for transmission via an OFDM symbol. In various embodiments, the mapping operation includes repetition, shift, reverse, shift-plus-reverse, reverse-plus-shift, as well as any other appropriate operations or combinations thereof. In some embodiments, the transmission data sequence is mapped to another transmission data sequence for transmission via another OFDM symbol. Different mapping operations may be used to support different data rates in the same MB-OFDM system as well as to support the same data rate in different MB-OFDM systems. Generating repeated input data sequence spreads the bits used by the OFDM symbol across different sub-carrier frequencies and achieves greater frequency diversity.

FIG. 2A is a block diagram illustrating a UWB transmitter embodiment. In this example, the modulation scheme employed is OFDM. Data bits received on medium access control (MAC) interface 200 are encoded by a forward error correction (FEC) encoder 202. The encoded bits are then interleaved and mapped to a transmission data sequence by an interleaver/bit mapper combination 204. The interleaver reorders the data bits to avoid transmitting successive code bits on neighboring sub-carriers in the same OFDM symbol, since adjacent sub-carriers tend to be subject to similar multipath and fading conditions. In some embodiments, the code bits are interleaved across several OFDM symbols.

The bit mapper performs one or more mapping operations on the data bits. As will be discussed in more details below, the bits may be mapped in a reverse order, in a shifted order, in the same order or in combinations thereof. The resulting data sequence is later transmitted in an OFDM symbol. In some embodiments, the bit mapper applies several mapping operations to the input bit sequence to generate several mapping results that are transmitted in a plurality of OFDM symbols. In some embodiments, the bit mapper applies a mapping operation to the input bit sequence to obtain a mapping result to be transmitted in an OFDM symbol, and then applies a second mapping operation to the mapping result to generate another output to be transmitted in another OFDM symbol. In embodiments where multiple mapping operations are used, the functions performed by these operations may be the same or different depending on system implementation. Mapping spreads the bandwidth of the transmitted signal beyond the information bandwidth, introduces additional frequency diversity and makes the transmitted signal more robust against multipath and interference.

The interleaved and repeated bits are then modulated into symbols by a symbol modulator 206. The example shown employs QPSK modulation, where consecutive bits are collected in pairs and then mapped onto a QPSK symbol. Other appropriate modulation techniques may be used as well. Pilot tone inserter 207 inserts pilot tones into the modulated symbols. An Inverse Fast Fourier Transform (IFFT) component 208 is used to transform blocks of symbols into a time domain waveform (also referred to as an OFDM symbol). In some embodiments, each OFDM symbol is repeated before a preamble, a guard interval and a cyclic/zero prefix are added to the OFDM symbol by prefix and guard inserter 210. In some embodiments, interpolation and amplitude clipping are optionally applied to the OFDM symbol. The inphase (I) and quadrature (Q) components of the baseband OFDM signal are converted from digital to analog by digital to analog converters (DACs) 216 and 218, respectively. The analog signals are sent to a radio transmitter 220 and transmitted via antenna 222.

FIG. 2B is a block diagram illustrating a UWB receiver embodiment. In this example, an OFDM signal is received on antenna 250 by radio receiver 252, which divides the signal into I and Q components and converts the signal to baseband. Analog to digital converters (ADCs) 254 and 256 convert the baseband signal to digital. In some embodiments, the digital baseband signal is optionally processed by a decimation stage 258. The prefix and guard intervals remover 260 removes the prefix and guard intervals. A Fast Fourier Transform (FFT) component 262 converts the time domain OFDM waveforms to frequency domain samples. Channel estimator and equalizer 264 processes the frequency domain samples to mitigate the effects of multipath propagation. After equalization, the repeated OFDM symbols are combined to 1 OFDM symbol. In this example, each received sub-carrier sample may be viewed either as a noisy QPSK symbol, or as a pair of noisy BPSK symbols taken from the real and imaginary part of the QPSK symbol. In both cases, the symbols are referred to as soft symbols.

The soft symbols are fed to deinterleaver/combiner 266, which performs the inverse function of interleaver/bit mapper 204 of FIG. 2A. Multiple received instances of the same soft symbol are combined into one. Combining can be implemented in various ways. In some embodiments, Maximal-Ratio (MR) combining is used, in which each soft symbol instance is weighted with the estimated amplitude of the sub-carrier on which it was received. The weighted soft symbols are then summed to obtain a single instance. Next, the resulting soft BPSK symbols are de-interleaved to reverse the operation of the interleaver. The sequence of de-interleaved BPSK symbols is decoded by FEC decoder 268. The decoded signal is sent to MAC interface 270 to be further processed.

Figure 3:
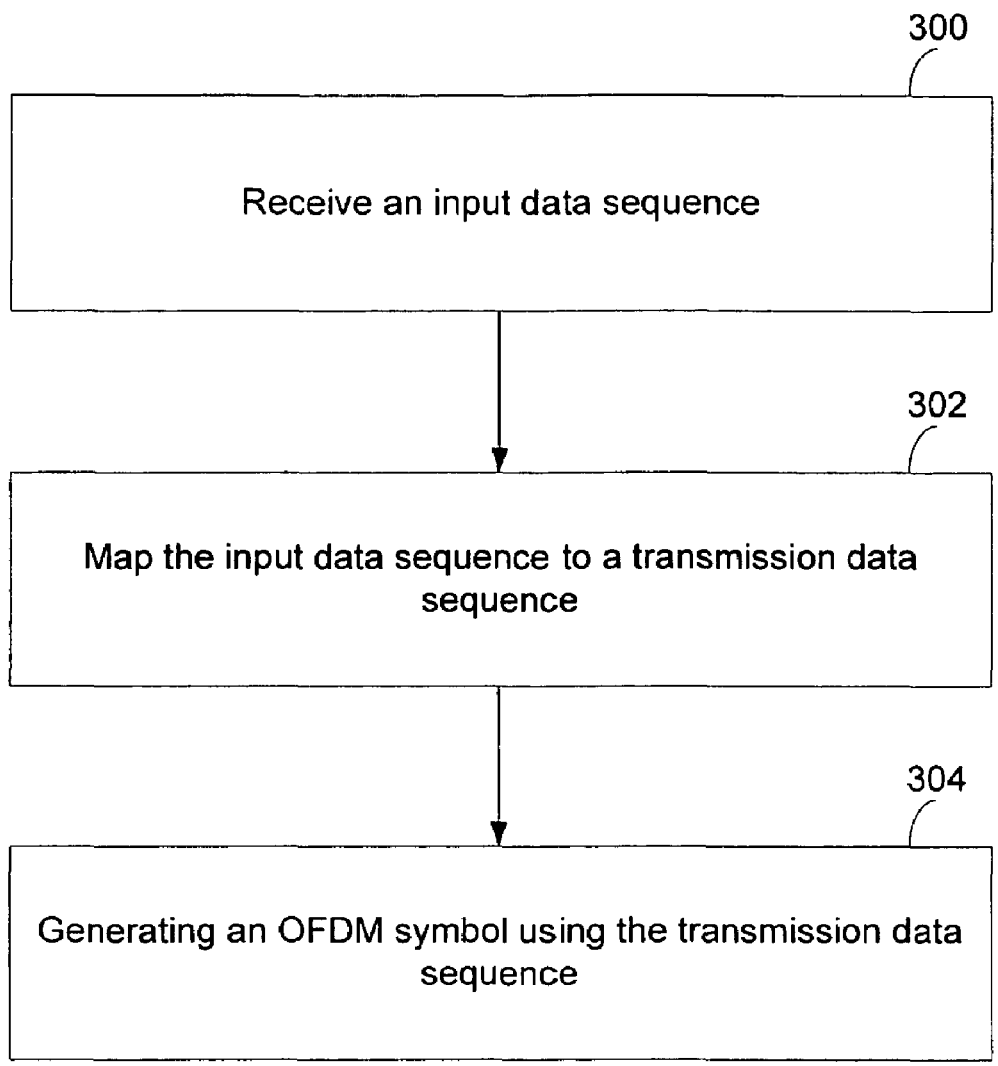
FIG. 3 is a flow chart illustrating a process for improving frequency diversity of a signal that includes OFDM symbols according to some embodiments.

FIG. 3 is a flow chart illustrating a process for improving frequency diversity of a signal that includes OFDM symbols according to some embodiments. In this example, an input data sequence is received (300). The input data sequence is then mapped to a transmission data sequence (302). As will be shown in more detail below, the mapping can be done using mapping operations such as shift, reverse, repeat, shift-plus-reverse and reverse-plus-shift, as well as any other appropriate operation or combinations thereof. The selection of the mapping operation may vary for different embodiments. An OFDM symbol is then generated using the transmission data sequence (304). The mapping operation is optionally repeated to generate more OFDM symbols based on the same input data sequence. In some embodiments, a different mapping operation may be used to generate a different transmission data sequence.

Figure 4A:
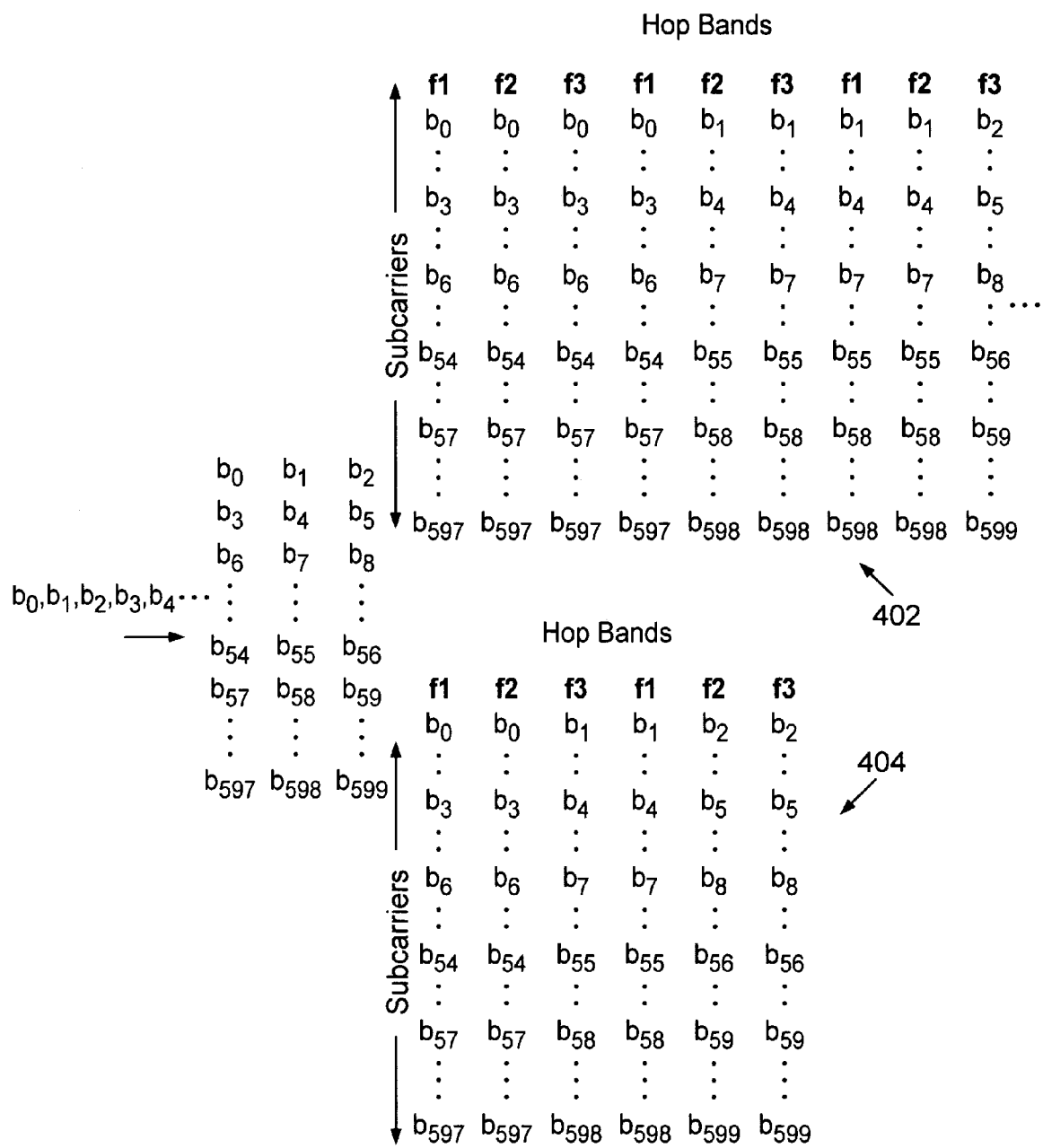
FIG. 4A is a diagram illustrating the results of interleaving and repetition functions according to some embodiments.

FIG. 4A is a diagram illustrating the results of interleaving and bit mapping functions according to some embodiments. In this example, a sequence of input bits $b_0, b_1, b_2, b_3 \ldots$ are sent to the interleaver. The data bits are initially interleaved into three input data sequences: a first sequence including bits $b_0, b_3, b_6, \ldots b_{597}$, a second sequence including $b_1, b_4, b_7, \ldots b_{598}$ and a third sequence including $b_2, b_5, b_8, \ldots b_{599}$.

In some embodiments, each of the sequences goes through a tone interleaver that maps the bits further apart on different sub-carriers. The interleaving depth used depends on implementation. For example, if a tone interleaving depth of 10 is used, after tone interleaving the first sequence becomes $b_0$, $b_{30}$, $b_{60}$, ... $b_{597}$, the second sequence becomes $b_1$, $b_{31}$, $b_{61}$, ... $b_{598}$ and the third sequence becomes $b_2$, $b_{32}$, $b_{62}$, ... $b_{599}$. Each input sequence is then modulated into an OFDM symbol using a set of sub-carriers in a hop band. In some embodiments, the modulation involves multiplying each number in the sequence with a corresponding sub-carrier signal. The same sequence of bits is then repeated in the same order and modulated into another OFDM symbol using the sub-carriers in the next hop band. In the diagram shown, transmission data patterns 402 and 404 are used to generate OFDM symbols to be transmitted at different rates. Each column of the transmission pattern is modulated to generate an OFDM symbol using the sub-carriers in the hop band shown in the first row of the columns. For the purpose of illustration, band hopping among three frequency bands f1, f2 and f3 in sequential order is shown in examples throughout this specification. Different numbers of hop bands and/or different hop order can be used in other embodiments.

In this example, the mapping function used is repetition. Each input bit sequence is repeated four times in pattern 402, where 600 data bits are transmitted over 12 OFDM symbols, achieving a transmission data rate of ¼ of the maximum rate. The repetition leads to some loss of frequency diversity since two OFDM symbols obtained from the same input bits are modulated using the same sub-carrier frequencies. For example, bit sequence $b_0$-$b_{597}$ is first modulated using sub-carriers in hop band f1, and the same duplicated bit block are subsequently modulated using sub-carriers in hop bands f2, f3, then f1 again. Transmitting the same symbol over the same set of sub-carrier frequencies means that the data is subject to similar multipath and fading conditions, resulting in diminished frequency diversity. In bit pattern 404, the bit sequence is repeated twice, which ameliorates the frequency diversity problem somewhat since the duplicated bit sequence is not repeated on the same sub-carrier frequencies. However, instances of neighboring bits (such as the first instance of $b_0$ and the second instance of $b_1$) may still be transmitted on the same sub-carrier frequency and therefore be subject to similar fading conditions.

Figure 4B:
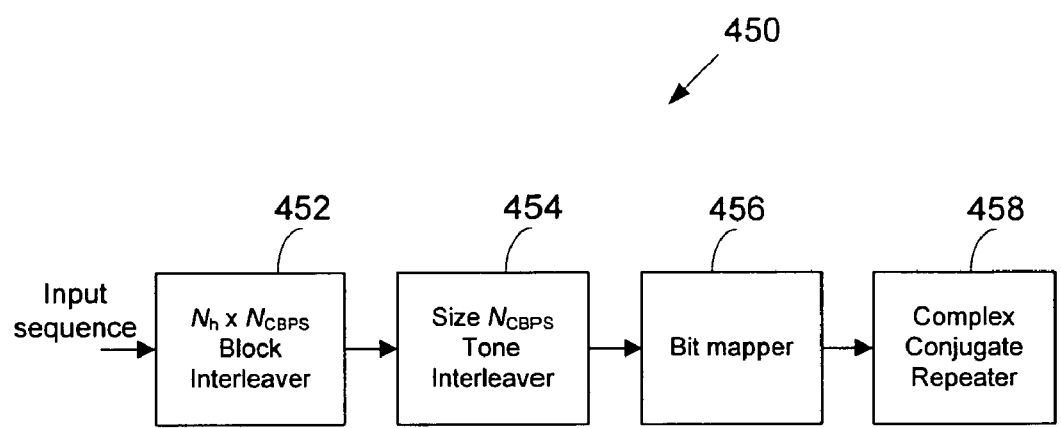
FIG. 4B is a block diagram illustrating an interleaver/bit mapper embodiment used to implement the interleaving and repetition functions shown in FIG. 4A.

FIG. 4B is a block diagram illustrating an interleaver/bit mapper embodiment used to implement the interleaving and repetition functions shown in FIG. 4A. In this example, the input data sequence is first interleaved using an $N_h \times N_{CBPS}$ block interleaver 452, where $N_h$ is a function of the number of hop bands and $N_{CBPS}$ corresponds to the number of code bits per OFDM symbol (which is set to 200 in the following examples) before repetition. Using interleaver 452, input bits are written column-wise into an $N_h \times N_{CBPS}$ matrix and then reading out in a row-wise order. Each sub-sequence of $N_h$ consecutive bits is spread over $N_h$ OFDM symbols (or hop bands). The resulting output bits are then interleaved in a second interleaver 454, also referred to as the tone interleaver, that operates on bit blocks of size $N_{CBPS}$ to distribute the $N_{CBPS}$ bits of each OFDM symbol over the different tones (sub-carriers).

Bit mapper 456 performs one or more mapping operations on the interleaved bits. The mapping operation used varies in some embodiments and depends on factors such as the operating data rate of the system. In the example shown, a repetition function is used to map the input bits into bit patterns such as 402 or 404. The output of bit mapper 456 is sent to an optional complex conjugate repeater 456, which repeats the bits within each block of $N_{CBPS}$ bits to expand the block to fit into one OFDM symbol. In some embodiments, some bits are inverted during repetition, collected in pairs and mapped onto blocks of QPSK symbols that exhibit complex-conjugate symmetry around its center. Such implementation results in IFFT outputs that are real-valued. In some embodiments, the complex conjugate operation is omitted. In the example shown, the mapping operation is performed before the complex conjugate operation. In some embodiments, the mapping operation is performed after the complex conjugate operation, or both before and after the complex conjugate operation.

Figure 5:
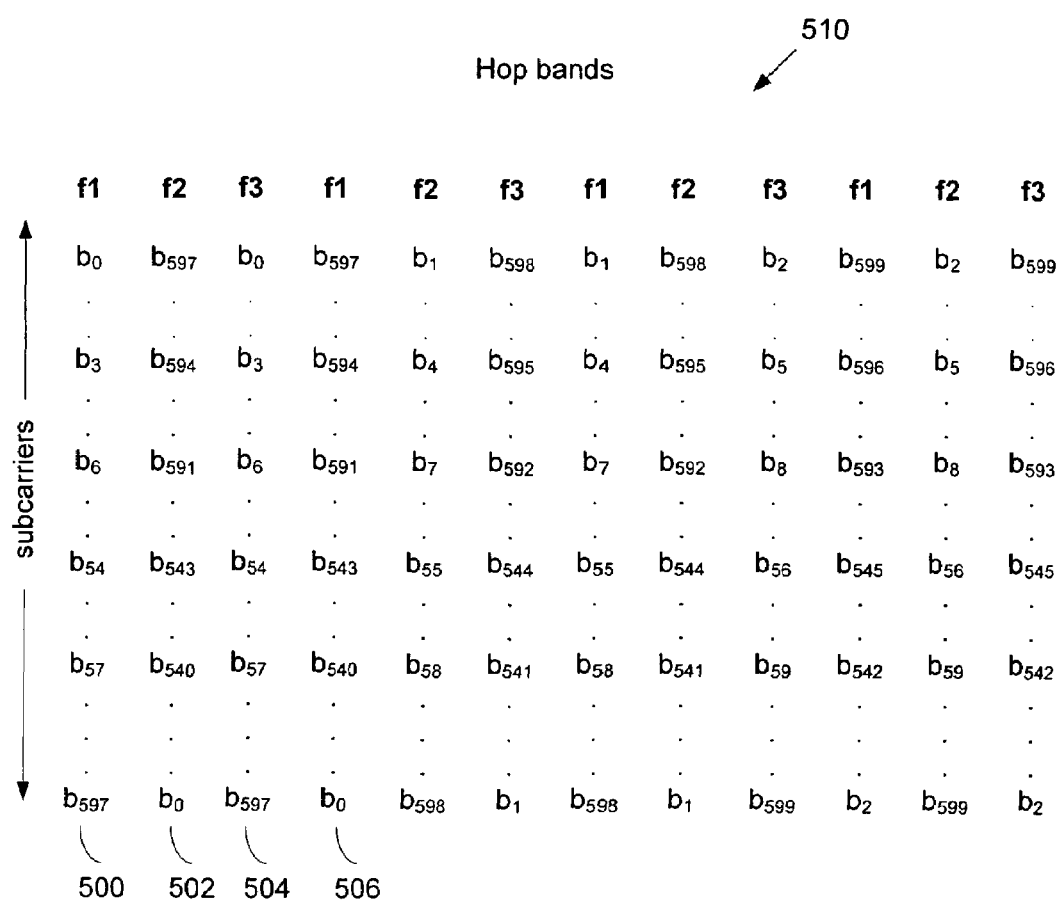
FIG. 5 is a diagram illustrating a transmission data pattern according to some embodiments.

FIG. 5 is a diagram illustrating a transmission data pattern according to some embodiments. For the purpose of illustration, examples showing expansion ratio of 4 are used throughout this specification, although other ratios are sometimes used in other embodiments. In this example, column 500 shows the first input data sequence (interleaved bit sequence $b_0$-$b_{597}$), which is modulated using sub-carriers in hop band f1. The mapping operation used to generate the transmit data sequence in this example is a reversal operation. Stated another way, the sequence of input data bits is reversed then modulated by sub-carriers in hop band f2, as shown in column 502. The process is repeated on the reversed sequence to obtain a transmission data sequence transmitted via hop band f3 (column 504), repeated again to obtain another transmission data sequence transmitted via hop band f1 (column 506), and so on. In some embodiments, rather than performing two inversions to generate data sequences associated with hop band f3 and subsequent hop band f1 following f3, transmission data sequences associated with first hop band f1 and hop band f2 are stored and repeated for hop band f3 and subsequent hop band f1. Similarly, input data bit sequence $b_1$-$b_{598}$ is used to generate four subsequent transmission data sequences corresponding to hop bands f2, f3, f1 and f2, and input data sequence $b_2$-$b_{599}$ is used to generate four subsequent transmission data sequences corresponding to hop bands f3, f1, f2 and f3. An interleaver/bit mapper block similar to 450 of FIG. 4B is used to generate bit pattern 510. The bit mapper used in this example is configured to perform a bit order reversal operation on the mapped bits.

In some embodiments, the mapping includes a shift operation. FIG. 6 is a diagram illustrating another transmission data pattern according to some embodiments. In this example, column 600 shows the mapping of input data sequence $b_0$-$b_{597}$ to sub-carriers in hop band f1. The data sequence is then shifted in a cyclic manner to generate a new sequence that is modulated using the sub-carriers associated with hop band f2. In the example shown, the bits are cyclically shifted by one position for each mapping operation, although any other appropriate length of shift (L) may be used. In some embodiments, to reduce data correlation in multipath and fading, the value of L is chosen to spread every repeated bit and its adjacent bits among sub-carrier frequencies that are far apart.

Other mapping operations sometimes used include shift-and-reverse where the input data sequence is first shifted then reversed, and reverse-and-shift where the input data sequence is first reversed and then shifted. FIG. 7 is a diagram illustrating another transmission data pattern according to some embodiments. In this example, shift-and-reverse as well as shift operations are used. The first input data sequence, shown in column 700, is used to generate the first OFDM symbol associated with hop band f1. The input data sequence is then cyclically shifted down by 1 bit and then reversed to generate the transmission data sequence associated with hop band f2, shown in column 702. Other shift lengths are used in different embodiments as appropriate. Different shift direction is also used in other embodiments. Another cyclic shift operation is applied to the new sequence to obtain the transmission data sequence associated with hop band f3, shown in column 704. Shift-and-reverse operation is then applied to the sequence shown in column 704 to generate another sequence shown in column 706. Input data sequences $b_1$-$b_{598}$ and $b_2$-$b_{599}$ undergo similar transformation to generate four OFDM symbols each.

Figure 8:
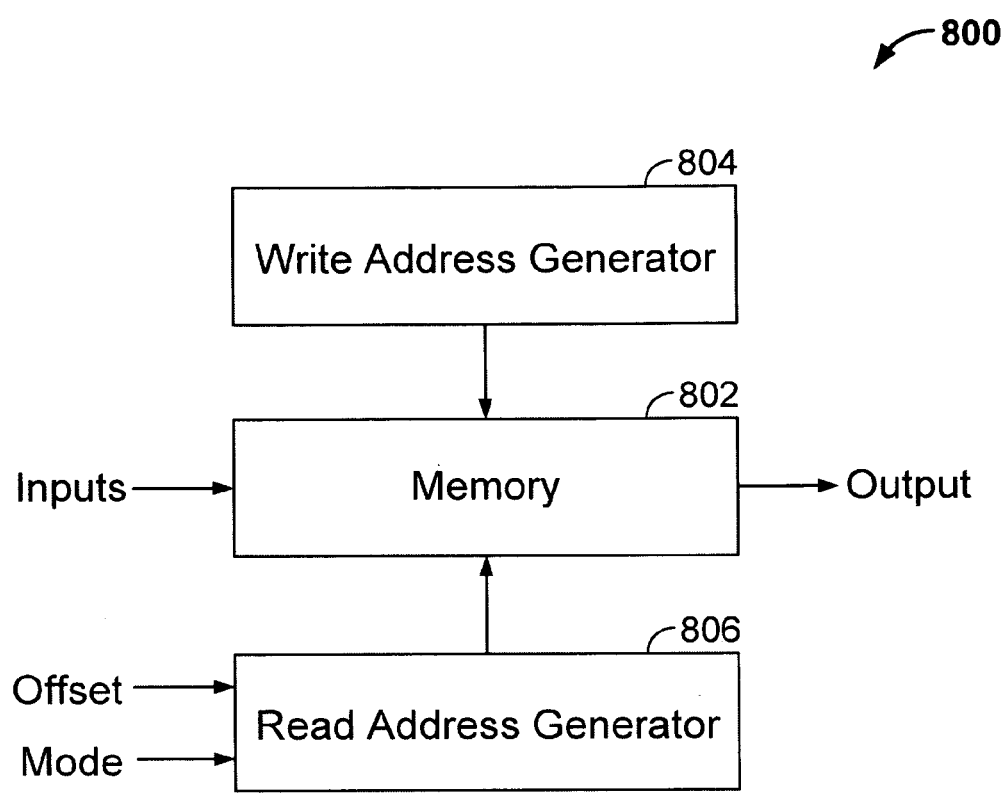
FIG. 8 is a block diagram illustrating a circuit used to implement the interleaving and repeating functions according to some embodiments.

FIG. 8 is a block diagram illustrating a circuit used to implement the interleaving and repeating functions according to some embodiments. In this example, both functions are performed by circuit 800. In some embodiments, the functions are implemented using separate components. The input data sequence is sent to a memory 802. A write address generator 804 determines the memory location to which each of the bits in the input sequence is written so that the bit sequences stored in memory 802 are interleaved. A read address generator 806 reads the interleaved sequences from the appropriate location to generate the transmission data sequence. In the example shown, read address generator 806 includes two controls: an offset control that determines the offset location into the stored interleaved sequence for the purposes of reading data out, and a mode control for determining whether the read operation reads the bits in the forward order or reverse order. Data is read from memory 802 multiple times to generate repeated transmission data sequences. In some embodiments, the interleaving and mapping functions may be implemented using separate components.

Figure 9:
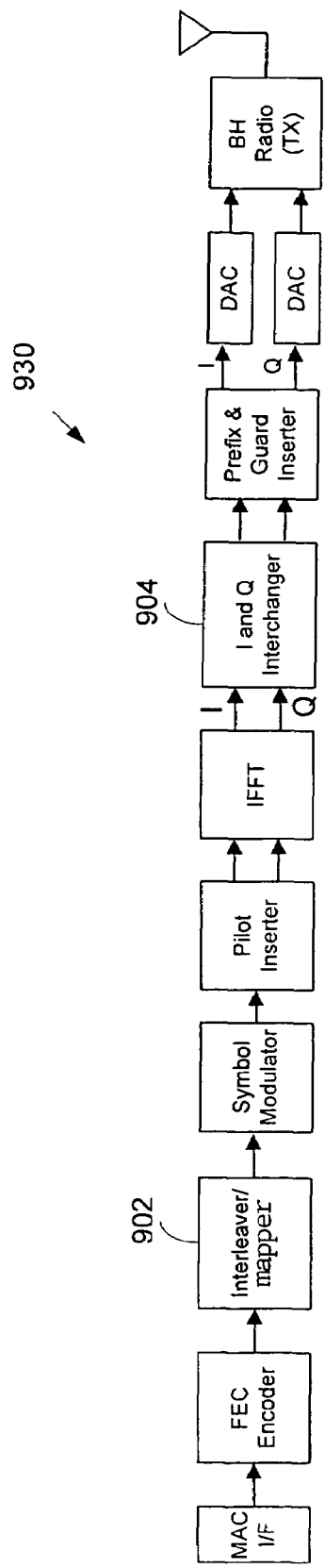
FIG. 9 is a block diagram illustrating another transmitter embodiment.

FIG. 9 is a block diagram illustrating another transmitter embodiment. Since a bit order reversal operation before the IFFT has the same effect as interchanging the real (I) and imaginary (Q) components of the complex QPSK symbols at the output of the IFFT, it can be performed prior to the IFFT as it is shown in transmitter 230 of FIG. 2, or performed after the IFFT as illustrated in this example. Like components of transmitter 930 and transmitter 230 perform like functions. In transmitter 930, interleaver/bit mapper 902 performs interleaving operation, shift operation or both. The bit order reversal operation is performed by I and Q interchanger 904. Interchanger 904 sends the first OFDM symbol as is and interchanges the I and Q components of the second OFDM symbol. Correspondingly, some receiver embodiments combine the OFDM symbols using combining techniques such as MR combining to form soft BPSK symbols (also referred to as soft bits), and then reverse the order of the soft bits for every other block of bits. The soft BPSK symbols are de-interleaved, first in a de-interleaver operating on blocks of $N_{CBPS}$ soft bits, reversing the effect of the tone interleaver in the transmitter, then in an $N_h \times N_{CBPS}$ block de-interleaver, reversing the effect of the first interleaver in the transmitter.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of improving frequency diversity of a signal that includes a plurality of orthogonal frequency division multiplexing (OFDM) symbols, comprising:

receiving an input data sequence;

mapping the input data sequence to a first transmission data sequence, wherein the mapping includes performing a first mapping operation;

generating a first OFDM symbol using the first transmission data sequence;

mapping the input data sequence to a second transmission data sequence, including by performing a second mapping operation;

generating a second OFDM symbol using the second transmission data sequence; and using a transmitter to transmit the first and/or second OFDM symbol using a three-band frequency hopping pattern and wherein mapping the input data sequence to the first and/or second transmission data sequence include(s) using a data pattern of

| $1^{st}$ band | $2^{nd}$ band | $3^{rd}$ band | $1^{st}$ band | $2^{nd}$ band | $3^{rd}$ band |
|---|---|---|---|---|---|
| $b_0$ | $b_0$ | $b_1$ | $b_1$ | $b_2$ | $b_2$ |
| $b_3$ | $b_3$ | $b_4$ | $b_4$ | $b_5$ | $b_5$ |
| $b_6$ | $b_6$ | $b_7$ | $b_7$ | $b_8$ | $b_8$ |
| . | . | . | . | . | . |
| . | . | . | . | . | . |
| . | . | . | . | . | . |
| $b_{54}$ | $b_{54}$ | $b_{55}$ | $b_{55}$ | $b_{56}$ | $b_{56}$ |
| $b_{57}$ | $b_{57}$ | $b_{58}$ | $b_{58}$ | $b_{59}$ | $b_{59}$ |
| . | . | . | . | . | . |
| . | . | . | . | . | . |
| . | . | . | . | . | . |
| $b_{597}$ | $b_{597}$ | $b_{598}$ | $b_{598}$ | $b_{599}$ | $b_{599}$. |

2. A method as recited in claim 1, wherein the first and/or second mapping operation further includes repetition, shift, reverse, shift-plus-reverse or reverse-plus-shift.

3. A method as recited in claim 2, wherein shift includes cyclic shift.

4. A method as recited in claim 1, further comprising applying an Inverse Fourier Transform to the first and/or second transmission data sequence.

5. A method as recited in claim 1, wherein using the data pattern includes interleaving the input data sequence.

6. A method as recited in claim 1, further comprising mapping the first transmission data sequence to a third transmission data sequence.

7. A method as recited in claim 1, further comprising repeating the first transmission data sequence in a third OFDM symbol.

8. A method of improving frequency diversity of a signal that includes a plurality of orthogonal frequency division multiplexing (OFDM) symbols, comprising:

receiving an input data sequence;

mapping the input data sequence to a first transmission data sequence wherein the mapping includes performing a first mapping operation;

generating a first OFDM symbol using the first transmission data sequence;

mapping the input data sequence to a second transmission data sequence, including by performing a second mapping operation;

generating a second OFDM symbol using the second transmission data sequence; and using a transmitter to transmit the first and/or second OFDM symbol using a three-band frequency hopping pattern and wherein mapping the input data sequence to the first and/or second transmission data sequence include(s) using a data pattern of

| 1st band | 2nd band | 3rd band | 1st band | 2nd band | 3rd band | 1st band | 2nd band | 3rd band | 1st band | 2nd band | 3rd band |
|---|---|---|---|---|---|---|---|---|---|---|---|
| $b_0$ | $b_0$ | $b_0$ | $b_0$ | $b_1$ | $b_1$ | $b_1$ | $b_1$ | $b_2$ | $b_2$ | $b_2$ | $b_2$ |
| $b_3$ | $b_3$ | $b_3$ | $b_3$ | $b_4$ | $b_4$ | $b_4$ | $b_4$ | $b_5$ | $b_5$ | $b_5$ | $b_5$ |
| $b_6$ | $b_6$ | $b_6$ | $b_6$ | $b_7$ | $b_7$ | $b_7$ | $b_7$ | $b_8$ | $b_8$ | $b_8$ | $b_8$ |
| . | . | . | . | . | . | . | . | . | . | . | . |
| . | . | . | . | . | . | . | . | . | . | . | . |
| $b_{54}$ | $b_{54}$ | $b_{54}$ | $b_{54}$ | $b_{55}$ | $b_{55}$ | $b_{55}$ | $b_{55}$ | $b_{56}$ | $b_{56}$ | $b_{56}$ | $b_{56}$ |
| $b_{57}$ | $b_{57}$ | $b_{57}$ | $b_{57}$ | $b_{58}$ | $b_{58}$ | $b_{58}$ | $b_{58}$ | $b_{59}$ | $b_{59}$ | $b_{59}$ | $b_{59}$ |
| . | . | . | . | . | . | . | . | . | . | . | . |
| . | . | . | . | . | . | . | . | . | . | . | . |
| $b_{597}$ | $b_{597}$ | $b_{597}$ | $b_{597}$ | $b_{598}$ | $b_{598}$ | $b_{598}$ | $b_{598}$ | $b_{599}$ | $b_{599}$ | $b_{599}$ | $b_{599}$. |

9. A method of improving frequency diversity of a signal that includes a plurality of orthogonal frequency division multiplexing (OFDM) symbols, comprising:
  receiving an input data sequence;
  mapping the input data sequence to a first transmission data sequence, wherein the mapping includes performing a first mapping operation;
  generating a first OFDM symbol using the first transmission data sequence;
  mapping the input data sequence to a second transmission data sequence, including by performing a second mapping operation;
  generating a second OFDM symbol using the second transmission data sequence; and
  using a transmitter to transmit the first and/or second OFDM symbol using a three-band frequency hopping pattern and wherein mapping the input data sequence to the first and/or second transmission data sequence include(s) using a data pattern of 10. A method of improving frequency diversity of a signal that includes a plurality of orthogonal frequency division multiplexing (OFDM) symbols, comprising:
  receiving an input data sequence;
  mapping the input data sequence to a first transmission data sequence, wherein the mapping includes performing a first mapping operation;
  generating a first OFDM symbol using the first transmission data sequence;
  mapping the input data sequence to a second transmission data sequence, including by performing a second mapping operation;
  generating a second OFDM symbol using the second transmission data sequence; and
  using a transmitter to transmit the first and/or second OFDM symbol using a three-band frequency hopping pattern and wherein mapping the input data sequence to the first and/or second transmission data sequence include(s) using a data pattern of

| 1st band | 2nd band | 3rd band | 1st band | 2nd band | 3rd band | 1st band | 2nd band | 3rd band | 1st band | 2nd band | 3rd band |
|---|---|---|---|---|---|---|---|---|---|---|---|
| $b_0$ | $b_{597}$ | $b_0$ | $b_{597}$ | $b_1$ | $b_{598}$ | $b_1$ | $b_{598}$ | $b_2$ | $b_{599}$ | $b_2$ | $b_{599}$ |
| $b_3$ | $b_{594}$ | $b_3$ | $b_{594}$ | $b_4$ | $b_{595}$ | $b_4$ | $b_{595}$ | $b_5$ | $b_{596}$ | $b_5$ | $b_{596}$ |
| $b_6$ | $b_{591}$ | $b_6$ | $b_{591}$ | $b_7$ | $b_{592}$ | $b_7$ | $b_{592}$ | $b_8$ | $b_{593}$ | $b_8$ | $b_{593}$ |
| . | . | . | . | . | . | . | . | . | . | . | . |
| . | . | . | . | . | . | . | . | . | . | . | . |
| $b_{54}$ | $b_{543}$ | $b_{54}$ | $b_{543}$ | $b_{55}$ | $b_{544}$ | $b_{55}$ | $b_{544}$ | $b_{56}$ | $b_{545}$ | $b_{56}$ | $b_{546}$ |
| $b_{57}$ | $b_{540}$ | $b_{57}$ | $b_{540}$ | $b_{58}$ | $b_{541}$ | $b_{58}$ | $b_{541}$ | $b_{59}$ | $b_{542}$ | $b_{59}$ | $b_{542}$ |
| . | . | . | . | . | . | . | . | . | . | . | . |
| . | . | . | . | . | . | . | . | . | . | . | . |
| $b_{597}$ | $b_0$ | $b_{597}$ | $b_0$ | $b_{598}$ | $b_1$ | $b_{598}$ | $b_1$ | $b_{599}$ | $b_2$ | $b_{599}$ | $b_2$. |

| 1st band | 2nd band | 3rd band | 1st band | 2nd band | 3rd band | 1st band | 2nd band | 3rd band | 1st band | 2nd band | 3rd band |
|---|---|---|---|---|---|---|---|---|---|---|---|
| $b_0$ | $b_{597}$ | $b_{567}$ | $b_{537}$ | $b_1$ | $b_{598}$ | $b_{568}$ | $b_{538}$ | $b_2$ | $b_{599}$ | $b_{569}$ | $b_{539}$ |
| $b_{30}$ | $b_0$ | $b_{597}$ | . | $b_{31}$ | $b_1$ | $b_{598}$ | . | $b_{32}$ | $b_2$ | $b_{599}$ | . |
| . | . | $b_0$ | . | . | $b_1$ | . | . | . | . | $b_2$ | . |
| $b_3$ | . | . | $b_0$ | $b_4$ | . | . | $b_1$ | $b_5$ | . | . | $b_2$ |
| . | $b_3$ | . | . | . | $b_4$ | . | . | . | $b_5$ | . | . |
| . | . | $b_3$ | . | . | . | $b_4$ | . | . | . | $b_5$ | . |
| $b_6$ | . | . | $b_3$ | $b_7$ | . | . | $b_4$ | $b_8$ | . | . | $b_5$ |
| . | $b_6$ | . | . | . | $b_7$ | . | . | . | $b_8$ | . | . |
| . | . | $b_6$ | . | . | . | $b_7$ | . | . | . | $b_8$ | . |
| $b_9$ | . | . | $b_6$ | $b_{10}$ | . | . | $b_7$ | $b_{11}$ | . | . | $b_8$ |
| . | $b_9$ | . | . | . | $b_{10}$ | . | . | . | $b_{11}$ | . | . |
| . | . | $b_9$ | . | . | . | $b_{10}$ | . | . | . | $b_{11}$ | . |
| $b_{12}$ | . | . | $b_9$ | $b_{13}$ | . | . | $b_{10}$ | $b_{14}$ | . | . | $b_{11}$ |
| . | $b_{12}$ | . | . | . | $b_{13}$ | . | . | . | $b_{14}$ | . | . |
| . | . | $b_{12}$ | . | . | . | $b_{13}$ | . | . | . | $b_{14}$ | . |
| . | . | . | $b_{12}$ | . | . | . | $b_{13}$ | . | . | . | $b_{14}$ |
| $b_{51}$ | . | . | . | $b_{52}$ | . | . | . | $b_{53}$ | . | . | . |
| . | $b_{51}$ | . | . | . | $b_{52}$ | . | . | . | $b_{53}$ | . | . |
| . | . | $b_{51}$ | . | . | . | $b_{52}$ | . | . | . | $b_{53}$ | . |
| $b_{54}$ | . | . | $b_{51}$ | $b_{55}$ | . | . | $b_{52}$ | $b_{56}$ | . | . | $b_{53}$ |
| . | $b_{54}$ | . | . | . | $b_{55}$ | . | . | . | $b_{56}$ | . | . |
| . | . | $b_{54}$ | . | . | . | $b_{55}$ | . | . | . | $b_{56}$ | . |
| $b_{57}$ | . | . | $b_{54}$ | $b_{58}$ | . | . | $b_{55}$ | $b_{59}$ | . | . | $b_{56}$ |
| . | . | . | . | . | . | . | . | . | . | . | . |
| $b_{567}$ | $b_{537}$ | . | . | $b_{568}$ | $b_{538}$ | . | . | $b_{569}$ | $b_{539}$ | . | . |
| $b_{597}$ | $b_{567}$ | $b_{537}$ | $b_{507}$ | $b_{598}$ | $b_{568}$ | $b_{538}$ | $b_{508}$ | $b_{599}$ | $b_{569}$ | $b_{539}$ | $b_{509}$. |

11. A method of improving frequency diversity of a signal that includes a plurality of orthogonal frequency division multiplexing (OFDM) symbols, comprising:

receiving an input data sequence;

mapping the input data sequence to a first transmission data sequence, wherein the mapping includes performing a first mapping operation;

generating a first OFDM symbol using the first transmission data sequence;

mapping the input data sequence to a second transmission data sequence, including by performing a second mapping operation;

generating a second OFDM symbol using the second transmission data sequence; and using a transmitter to transmit the first and/or second OFDM symbol using a three-band frequency hopping pattern and wherein mapping the input data sequence to the first and/or second transmission data sequence include(s) using a data pattern of

| 1st band | 2nd band | 3rd band | 1st band | 2nd band | 3rd band | 1st band | 2nd band | 3rd band | 1st band | 2nd band | 3rd band |
|---|---|---|---|---|---|---|---|---|---|---|---|
| $b_0$ | $b_{567}$ | $b_{597}$ | $b_{30}$ | $b_1$ | $b_{568}$ | $b_{598}$ | $b_{31}$ | $b_2$ | $b_{569}$ | $b_{599}$ | $b_{32}$ |
| . | $b_{537}$ | $b_{567}$ | $b_{60}$ | . | $b_{538}$ | $b_{568}$ | $b_{61}$ | . | $b_{539}$ | $b_{569}$ | $b_{62}$ |
| . | . | . | . | . | . | . | . | . | . | . | . |
| $b_3$ | $b_{564}$ | . | $b_{33}$ | $b_4$ | $b_{565}$ | . | $b_{34}$ | $b_5$ | $b_{566}$ | . | $b_{35}$ |
| . | . | $b_{564}$ | . | . | . | $b_{565}$ | . | . | . | $b_{566}$ | . |
| . | . | . | . | . | . | . | . | . | . | . | . |
| $b_6$ | $b_{561}$ | . | $b_{36}$ | $b_7$ | $b_{562}$ | . | $b_{37}$ | $b_8$ | $b_{563}$ | . | $b_{38}$ |
| . | . | $b_{561}$ | . | . | . | $b_{562}$ | . | . | . | $b_{563}$ | . |
| . | . | . | . | . | . | . | . | . | . | . | . |
| $b_9$ | $b_{558}$ | . | $b_{39}$ | $b_{10}$ | $b_{559}$ | . | $b_{40}$ | $b_{11}$ | $b_{560}$ | . | $b_{41}$ |
| . | . | $b_{558}$ | . | . | . | $b_{559}$ | . | . | . | $b_{560}$ | . |
| . | . | . | . | . | . | . | . | . | . | . | . |
| $b_{12}$ | $b_{555}$ | . | $b_{42}$ | $b_{13}$ | $b_{556}$ | . | $b_{43}$ | $b_{14}$ | $b_{557}$ | . | $b_{44}$ |
| . | . | . | . | . | . | . | . | . | . | . | . |
| . | . | . | . | . | . | . | . | . | . | . | . |
| $b_{594}$ | $b_{570}$ | . | $b_{27}$ | $b_{595}$ | $b_{571}$ | . | $b_{28}$ | $b_{596}$ | $b_{572}$ | . | $b_{29}$ |
| . | . | $b_{570}$ | . | . | . | $b_{571}$ | . | . | . | $b_{572}$ | . |
| $b_{567}$ | $b_0$ | . | $b_{597}$ | $b_{568}$ | $b_1$ | . | $b_{598}$ | $b_{569}$ | $b_2$ | . | $b_{599}$ |
| $b_{597}$ | $b_{597}$ | $b_0$ | $b_0$ | $b_{598}$ | $b_{598}$ | $b_1$ | $b_1$ | $b_{599}$ | $b_{599}$ | $b_2$ | $b_2$. |

12. An orthogonal frequency division multiplexing (OFDM) transmitter comprising:
   an interface configured to receive an input data sequence;
   a processor coupled to the interface, configured to:
      map the input data sequence to a first transmission data sequence, wherein the mapping includes performing a first mapping operation;
      generate a first OFDM symbol using the first transmission data sequence;
      map the input data sequence to a second transmission data sequence, including by performing a second mapping operation; and
      generate a second OFDM symbol using the second transmission data sequence; and
   a transmitter configured to transmit the first and/or second OFDM symbol using a three-band frequency hopping pattern and wherein the processor is configured to map the input data sequence to the first and/or second transmission data sequence by using a data pattern of

| 1st band | 2nd band | 3rd band | 1st band | 2nd band | 3rd band | 1st band | 2nd band | 3rd band | 1st band | 2nd band | 3rd band |
|---|---|---|---|---|---|---|---|---|---|---|---|
| $b_0$ | $b_0$ | $b_0$ | $b_0$ | $b_1$ | $b_1$ | $b_1$ | $b_1$ | $b_2$ | $b_2$ | $b_2$ | $b_2$ |
| $b_3$ | $b_3$ | $b_3$ | $b_3$ | $b_4$ | $b_4$ | $b_4$ | $b_4$ | $b_5$ | $b_5$ | $b_5$ | $b_5$ |
| $b_6$ | $b_6$ | $b_6$ | $b_6$ | $b_7$ | $b_7$ | $b_7$ | $b_7$ | $b_8$ | $b_8$ | $b_8$ | $b_8$ |
| . | . | . | . | . | . | . | . | . | . | . | . |
| . | . | . | . | . | . | . | . | . | . | . | . |
| . | . | . | . | . | . | . | . | . | . | . | . |
| $b_{54}$ | $b_{54}$ | $b_{54}$ | $b_{54}$ | $b_{55}$ | $b_{55}$ | $b_{55}$ | $b_{55}$ | $b_{56}$ | $b_{56}$ | $b_{56}$ | $b_{56}$ |
| $b_{57}$ | $b_{57}$ | $b_{57}$ | $b_{57}$ | $b_{58}$ | $b_{58}$ | $b_{58}$ | $b_{58}$ | $b_{59}$ | $b_{59}$ | $b_{59}$ | $b_{59}$ |
| . | . | . | . | . | . | . | . | . | . | . | . |
| . | . | . | . | . | . | . | . | . | . | . | . |
| . | . | . | . | . | . | . | . | . | . | . | . |
| $b_{597}$ | $b_{597}$ | $b_{597}$ | $b_{597}$ | $b_{598}$ | $b_{598}$ | $b_{598}$ | $b_{598}$ | $b_{599}$ | $b_{599}$ | $b_{599}$ | $b_{599}$. |

13. An orthogonal frequency division multiplexing (OFDM) transmitter comprising:
   an interface configured to receive an input data sequence;
   a processor coupled to the interface, configured to:
      map the input data sequence to a first transmission data sequence, wherein the mapping includes performing a first mapping operation;
      generate a first OFDM symbol using the first transmission data sequence;
      map the input data sequence to a second transmission data sequence, including by performing a second mapping operation; and
      generate a second OFDM symbol using the second transmission data sequence; and
   a transmitter configured to transmit the first and/or second OFDM symbol using a three-band frequency hopping pattern and wherein the processor is configured to map the input data sequence to the first and/or second transmission data sequence by using a data pattern of

| $1^{st}$ band | $2^{nd}$ band | $3^{rd}$ band | $1^{st}$ band | $2^{nd}$ band | $3^{rd}$ band |
|---|---|---|---|---|---|
| $b_0$ | $b_0$ | $b_1$ | $b_1$ | $b_2$ | $b_2$ |
| $b_3$ | $b_3$ | $b_4$ | $b_4$ | $b_5$ | $b_5$ |
| $b_6$ | $b_6$ | $b_7$ | $b_7$ | $b_8$ | $b_8$ |
| . | . | . | . | . | . |
| . | . | . | . | . | . |
| . | . | . | . | . | . |
| $b_{54}$ | $b_{54}$ | $b_{55}$ | $b_{55}$ | $b_{56}$ | $b_{56}$ |
| $b_{57}$ | $b_{57}$ | $b_{58}$ | $b_{58}$ | $b_{59}$ | $b_{59}$ |
| . | . | . | . | . | . |
| . | . | . | . | . | . |
| . | . | . | . | . | . |
| $b_{597}$ | $b_{597}$ | $b_{598}$ | $b_{598}$ | $b_{599}$ | $b_{599}$. |

14. An OFDM transmitter as recited in claim 13, wherein the first and/or second mapping operation further includes repetition, shift, reverse, shift-plus-reverse or reverse-plus-shift.

15. An OFDM transmitter as recited in claim 14, wherein shift includes cyclic shift.

16. An OFDM transmitter as recited in claim 13, wherein the processor is further configured to apply an Inverse Fourier Transform to the first and/or second transmission data sequence.

17. An OFDM transmitter as recited in claim 13, wherein the processor is configured to use the data pattern by interleaving the input data sequence.

18. An OFDM transmitter as recited in claim 13, wherein processor is further configured to map the first transmission data sequence to a third transmission data sequence.

19. An OFDM transmitted as recited in claim 13, wherein processor is further configured to repeat the first transmission data sequence in a third OFDM symbol.

20. An orthogonal frequency division multiplexing (OFDM) transmitter comprising:
   an interface configured to receive an input data sequence;
   a processor coupled to the interface, configured to:
      map the input data sequence to a first transmission data sequence, wherein the mapping includes performing a first mapping operation;
      generate a first OFDM symbol using the first transmission data sequence;
      map the input data sequence to a second transmission data sequence, including by performing a second mapping operation; and
      generate a second OFDM symbol using the second transmission data sequence; and
   a transmitter configured to transmit the first and/or second OFDM symbol using a three-band frequency hopping pattern and wherein the processor is configured to map the input data sequence to the first and/or second transmission data sequence by using a data pattern of

| 1st band | 2nd band | 3rd band | 1st band | 2nd band | 3rd band | 1st band | 2nd band | 3rd band | 1st band | 2nd band | 3rd band |
|---|---|---|---|---|---|---|---|---|---|---|---|
| $b_0$ | $b_{597}$ | $b_0$ | $b_{597}$ | $b_1$ | $b_{598}$ | $b_1$ | $b_{598}$ | $b_2$ | $b_{599}$ | $b_2$ | $b_{599}$ |
| $b_3$ | $b_{594}$ | $b_3$ | $b_{594}$ | $b_4$ | $b_{595}$ | $b_4$ | $b_{595}$ | $b_5$ | $b_{596}$ | $b_5$ | $b_{596}$ |
| $b_6$ | $b_{591}$ | $b_6$ | $b_{591}$ | $b_7$ | $b_{592}$ | $b_7$ | $b_{592}$ | $b_8$ | $b_{593}$ | $b_8$ | $b_{593}$ |
| . | . | . | . | . | . | . | . | . | . | . | . |
| . | . | . | . | . | . | . | . | . | . | . | . |
| $b_{54}$ | $b_{543}$ | $b_{54}$ | $b_{543}$ | $b_{55}$ | $b_{544}$ | $b_{55}$ | $b_{544}$ | $b_{56}$ | $b_{545}$ | $b_{56}$ | $b_{545}$ |
| $b_{57}$ | $b_{540}$ | $b_{57}$ | $b_{540}$ | $b_{58}$ | $b_{541}$ | $b_{58}$ | $b_{541}$ | $b_{59}$ | $b_{542}$ | $b_{59}$ | $b_{542}$ |
| . | . | . | . | . | . | . | . | . | . | . | . |
| . | . | . | . | . | . | . | . | . | . | . | . |
| $b_{597}$ | $b_0$ | $b_{597}$ | $b_0$ | $b_{598}$ | $b_1$ | $b_{598}$ | $b_1$ | $b_{599}$ | $b_2$ | $b_{599}$ | $b_2$. |

21. An orthogonal frequency division multiplexing (OFDM) transmitter comprising:

an interface configured to receive an input data sequence;

a processor coupled to the interface, configured to:

map the input data sequence to a first transmission data sequence, wherein the mapping includes performing a first mapping operation;

generate a first OFDM symbol using the first transmission data sequence;

map the input data sequence to a second transmission data sequence, including by performing a second mapping operation; and generate a second OFDM symbol using the second transmission data sequence; and a transmitter configured to transmit the first and/or second OFDM symbol using a three-band frequency hopping pattern and wherein the processor is configured to map the input data sequence to the first and/or second transmission data sequence by using a data pattern of

| 1st band | 2nd band | 3rd band | 1st band | 2nd band | 3rd band | 1st band | 2nd band | 3rd band | 1st band | 2nd band | 3rd band |
|---|---|---|---|---|---|---|---|---|---|---|---|
| $b_0$ | $b_{597}$ | $b_{567}$ | $b_{537}$ | $b_1$ | $b_{598}$ | $b_{568}$ | $b_{538}$ | $b_2$ | $b_{599}$ | $b_{569}$ | $b_{539}$ |
| $b_{30}$ | $b_0$ | $b_{597}$ | . | $b_{31}$ | $b_1$ | $b_{598}$ | . | $b_{32}$ | $b_2$ | $b_{599}$ | . |
| . | . | $b_0$ | . | . | . | $b_1$ | . | . | . | $b_2$ | . |
| $b_3$ | . | . | $b_0$ | $b_4$ | . | . | $b_1$ | $b_5$ | . | . | $b_2$ |
| . | $b_3$ | . | . | . | $b_4$ | . | . | . | $b_5$ | . | . |
| . | . | $b_3$ | . | . | . | $b_4$ | . | . | . | $b_5$ | . |
| $b_6$ | . | . | $b_3$ | $b_7$ | . | . | $b_4$ | $b_8$ | . | . | $b_5$ |
| . | $b_6$ | . | . | . | $b_7$ | . | . | . | $b_8$ | . | . |
| . | . | $b_6$ | . | . | . | $b_7$ | . | . | . | $b_8$ | . |
| $b_9$ | . | . | $b_6$ | $b_{10}$ | . | . | $b_7$ | $b_{11}$ | . | . | $b_8$ |
| . | $b_9$ | . | . | . | $b_{10}$ | . | . | . | $b_{11}$ | . | . |
| . | . | $b_9$ | . | . | . | $b_{10}$ | . | . | . | $b_{11}$ | . |
| $b_{12}$ | . | . | $b_9$ | $b_{13}$ | . | . | $b_{10}$ | $b_{14}$ | . | . | $b_{11}$ |
| . | $b_{12}$ | . | . | . | $b_{13}$ | . | . | . | $b_{14}$ | . | . |
| . | . | $b_{12}$ | . | . | . | $b_{13}$ | . | . | . | $b_{14}$ | . |
| . | . | . | $b_{12}$ | . | . | . | $b_{13}$ | . | . | . | $b_{14}$ |
| $b_{51}$ | . | . | . | $b_{52}$ | . | . | . | $b_{53}$ | . | . | . |
| . | $b_{51}$ | . | . | . | $b_{52}$ | . | . | . | $b_{53}$ | . | . |
| . | . | $b_{51}$ | . | . | . | $b_{52}$ | . | . | . | $b_{53}$ | . |
| $b_{54}$ | . | . | $b_{51}$ | $b_{55}$ | . | . | $b_{52}$ | $b_{56}$ | . | . | $b_{53}$ |
| . | $b_{54}$ | . | . | . | $b_{55}$ | . | . | . | $b_{56}$ | . | . |
| . | . | $b_{54}$ | . | . | . | $b_{55}$ | . | . | . | $b_{56}$ | . |
| $b_{57}$ | . | . | $b_{54}$ | $b_{58}$ | . | . | $b_{55}$ | $b_{59}$ | . | . | $b_{56}$ |
| . | . | . | . | . | . | . | . | . | . | . | . |
| $b_{567}$ | $b_{537}$ | . | . | $b_{568}$ | $b_{538}$ | . | . | $b_{569}$ | $b_{539}$ | . | . |
| $b_{597}$ | $b_{567}$ | $b_{537}$ | $b_{507}$ | $b_{598}$ | $b_{568}$ | $b_{538}$ | $b_{508}$ | $b_{599}$ | $b_{569}$ | $b_{539}$ | $b_{509}$. |

22. An orthogonal frequency division multiplexing (OFDM) transmitter comprising:
  an interface configured to receive an input data sequence;
  a processor coupled to the interface, configured to:
    map the input data sequence to a first transmission data sequence, wherein the mapping includes performing a first mapping operation;
    generate a first OFDM symbol using the first transmission data sequence;
    map the input data sequence to a second transmission data sequence, including by performing a second mapping operation; and
    generate a second OFDM symbol using the second transmission data sequence; and
  a transmitter configured to transmit the first and/or second OFDM symbol using a three-band frequency hopping pattern and wherein the processor is configured to map the input data sequence to the first and/or second transmission data sequence by using a data pattern of

| 1st band | 2nd band | 3rd band | 1st band | 2nd band | 3rd band | 1st band | 2nd band | 3rd band | 1st band | 2nd band | 3rd band |
|---|---|---|---|---|---|---|---|---|---|---|---|
| $b_0$ | $b_{567}$ | $b_{597}$ | $b_{30}$ | $b_1$ | $b_{568}$ | $b_{598}$ | $b_{31}$ | $b_2$ | $b_{569}$ | $b_{599}$ | $b_{32}$ |
| . | $b_{537}$ | $b_{567}$ | $b_{60}$ | . | $b_{538}$ | $b_{568}$ | $b_{61}$ | . | $b_{539}$ | $b_{569}$ | $b_{62}$ |
| . | . | . | . | . | . | . | . | . | . | . | . |
| $b_3$ | $b_{564}$ | . | $b_{33}$ | $b_4$ | $b_{565}$ | . | $b_{34}$ | $b_5$ | $b_{566}$ | . | $b_{35}$ |
| . | . | $b_{564}$ | . | . | . | $b_{565}$ | . | . | . | $b_{566}$ | . |
| . | . | . | . | . | . | . | . | . | . | . | . |
| $b_6$ | $b_{561}$ | . | $b_{36}$ | $b_7$ | $b_{562}$ | . | $b_{37}$ | $b_8$ | $b_{563}$ | . | $b_{38}$ |
| . | . | $b_{561}$ | . | . | . | $b_{562}$ | . | . | . | $b_{563}$ | . |
| . | . | . | . | . | . | . | . | . | . | . | . |
| $b_9$ | $b_{558}$ | . | $b_{39}$ | $b_{10}$ | $b_{559}$ | . | $b_{40}$ | $b_{11}$ | $b_{560}$ | . | $b_{41}$ |
| . | . | $b_{558}$ | . | . | . | $b_{559}$ | . | . | . | $b_{560}$ | . |
| . | . | . | . | . | . | . | . | . | . | . | . |
| $b_{12}$ | $b_{555}$ | . | $b_{42}$ | $b_{13}$ | $b_{556}$ | . | $b_{43}$ | $b_{14}$ | $b_{557}$ | . | $b_{44}$ |
| . | . | . | . | . | . | . | . | . | . | . | . |
| . | . | . | . | . | . | . | . | . | . | . | . |
| $b_{594}$ | $b_{570}$ | . | $b_{27}$ | $b_{595}$ | $b_{571}$ | . | $b_{28}$ | $b_{596}$ | $b_{572}$ | . | $b_{29}$ |
| . | . | $b_{570}$ | . | . | . | $b_{571}$ | . | . | . | $b_{572}$ | . |
| $b_{567}$ | $b_0$ | . | $b_{597}$ | $b_{568}$ | $b_1$ | . | $b_{598}$ | $b_{569}$ | $b_2$ | . | $b_{599}$ |
| $b_{597}$ | $b_{597}$ | $b_0$ | $b_0$ | $b_{598}$ | $b_{598}$ | $b_1$ | $b_1$ | $b_{599}$ | $b_{599}$ | $b_2$ | $b_2$. |

\* \* \* \* \*

UNITED STATES PATENT AND TRADEMARK OFFICE
CERTIFICATE OF CORRECTION

PATENT NO. : 7,535,819 B1
APPLICATION NO. : 10/948615
DATED : May 19, 2009
INVENTOR(S) : Larsson et al.

It is certified that error appears in the above-identified patent and that said Letters Patent is hereby corrected as shown below:

Column 8, line 53 delete "sequence wherein" and insert --sequence, wherein--

Signed and Sealed this

Fourteenth Day of July, 2009

JOHN DOLL
*Acting Director of the United States Patent and Trademark Office*